(No Model.)  5 Sheets—Sheet 2.
J. W. MEAKER.
FARE REGISTER.
No. 478,167.  Patented July 5, 1892.
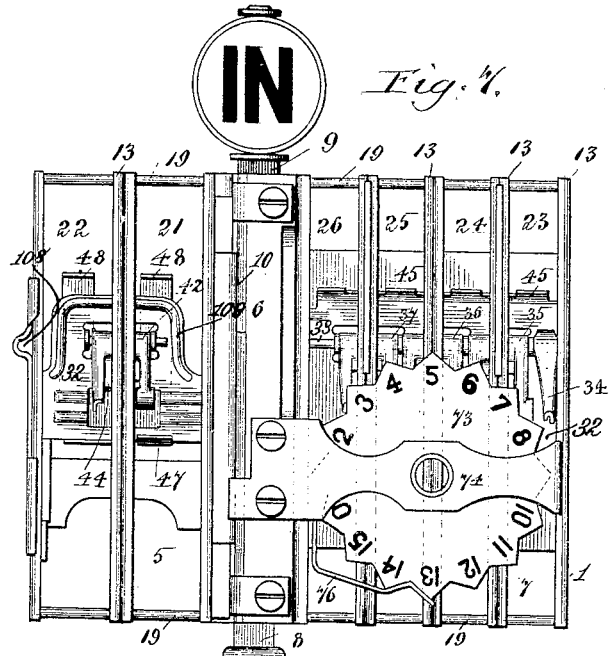
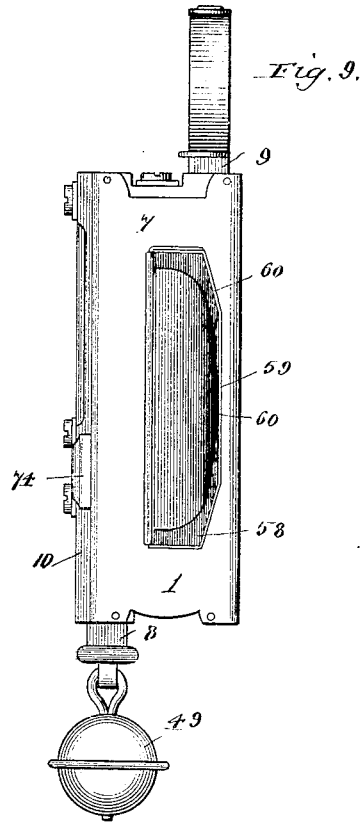
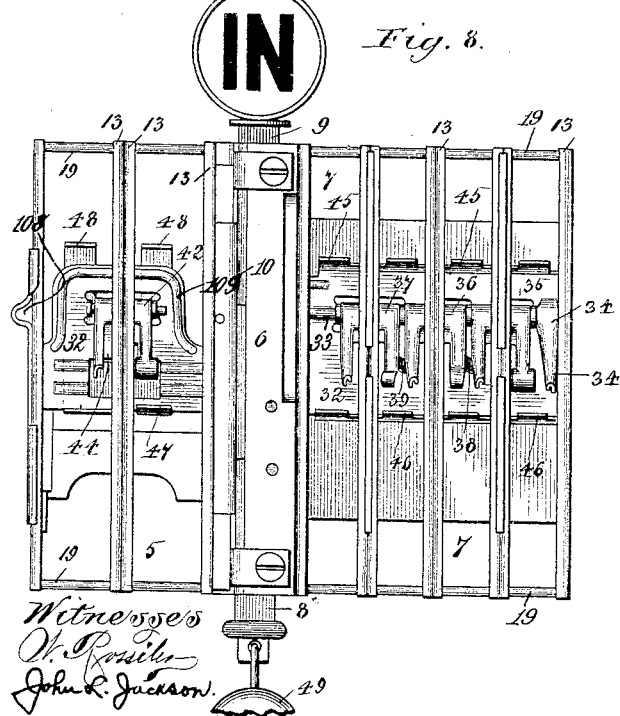
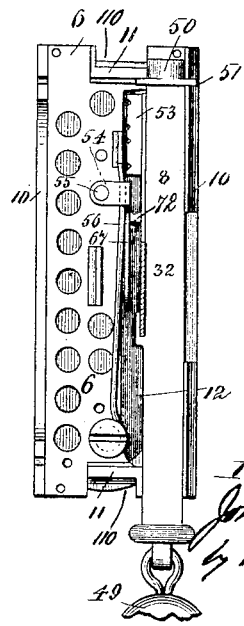

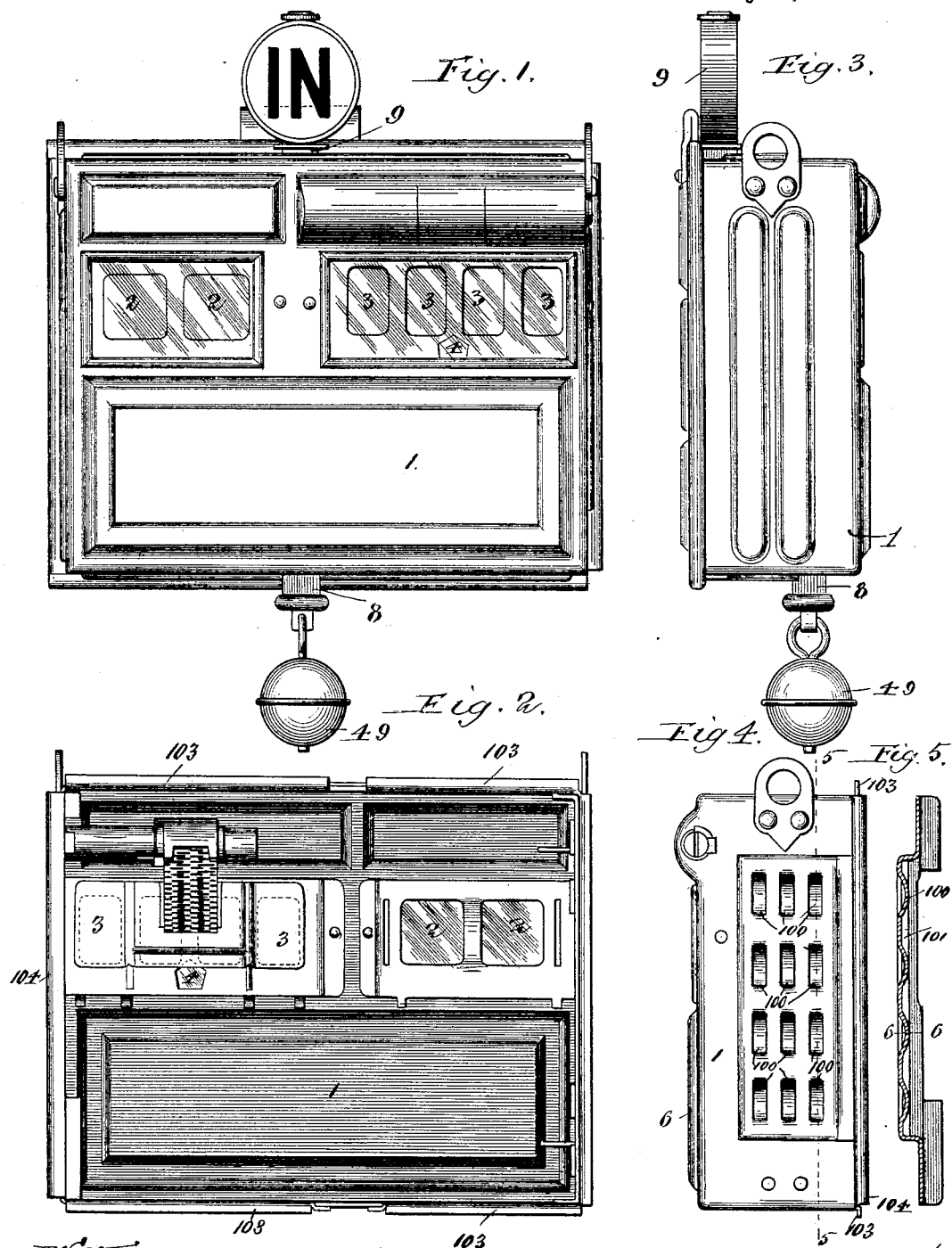

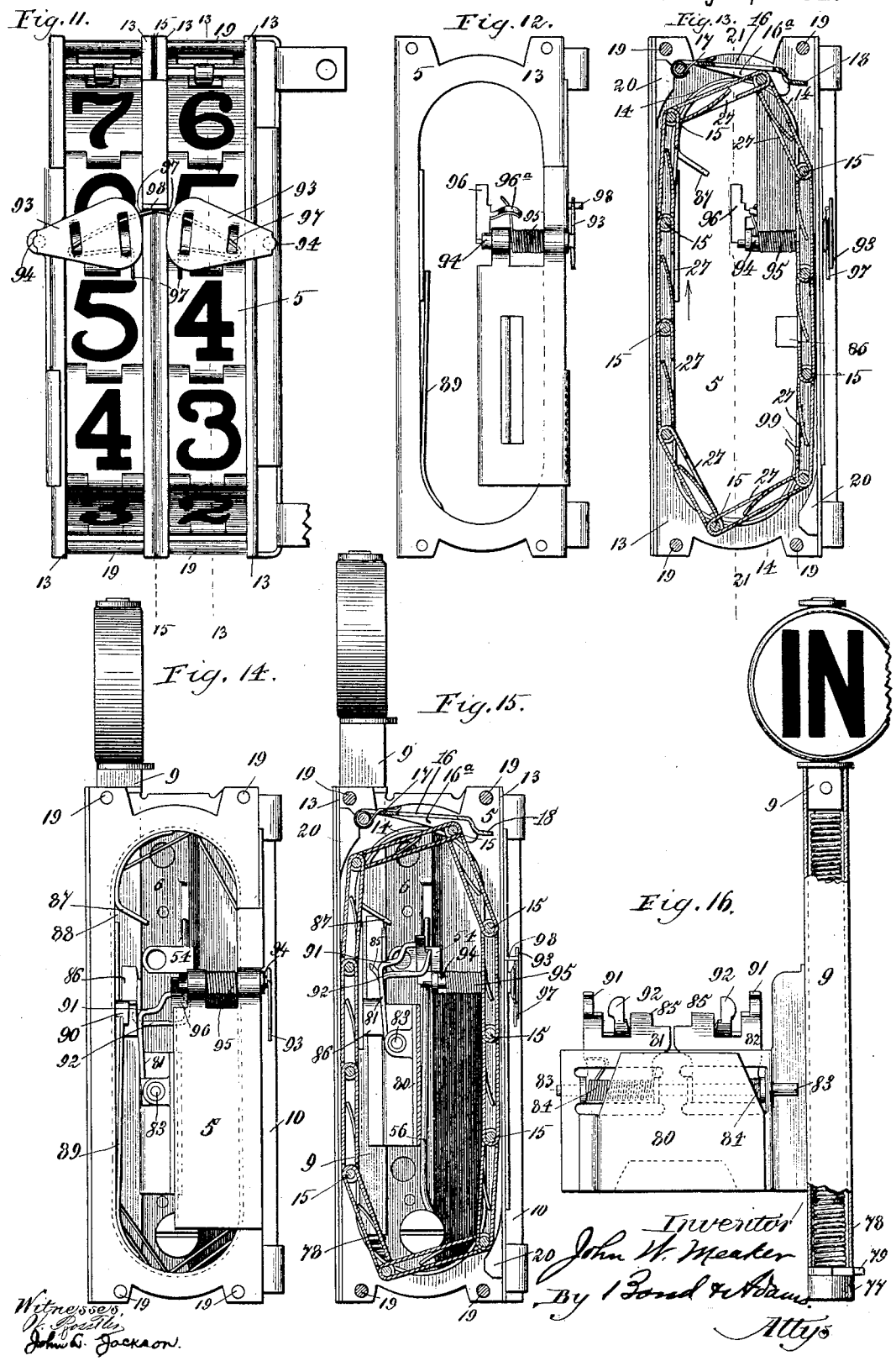

(No Model.) 5 Sheets—Sheet 4.
J. W. MEAKER.
FARE REGISTER.
No. 478,167. Patented July 5, 1892.
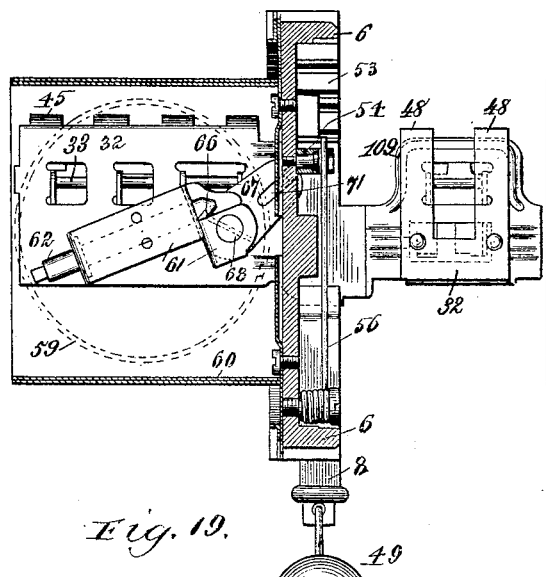
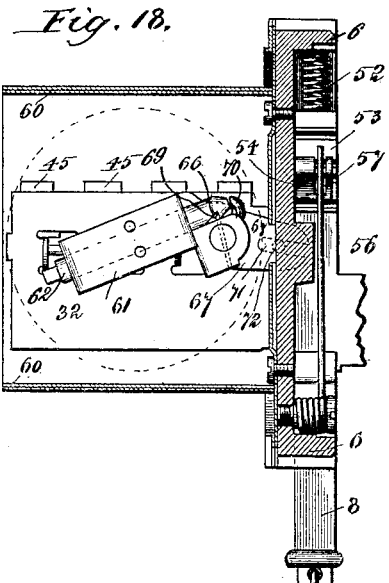
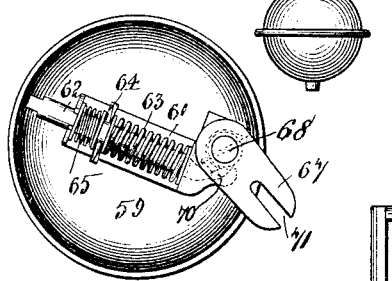
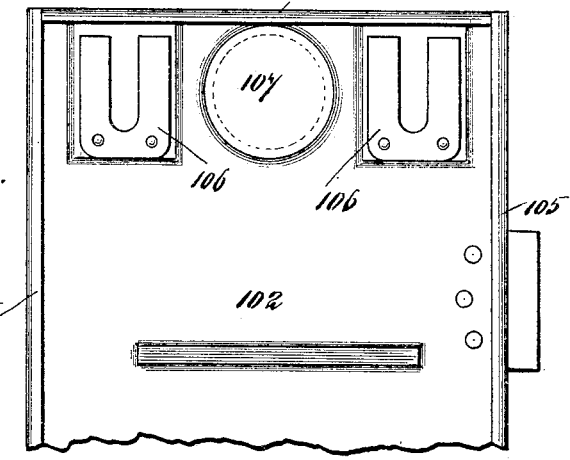
Witnesses
W. Rossiter
John L. Jackson
Inventor
John W. Meaker
By Bond & Adams,
Attys.

(No Model.) 5 Sheets—Sheet 5.
J. W. MEAKER.
FARE REGISTER.
No. 478,167. Patented July 5, 1892.
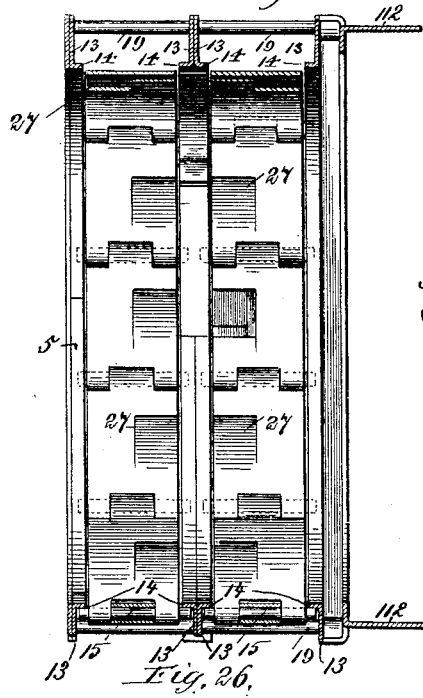
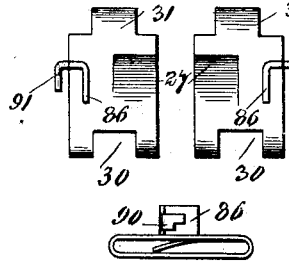
Witnesses
W. Rossiter
John L. Jackson
Inventor
John W. Meaker
By Bond & Adams
Attys.

United States Patent Office.

JOHN W. MEAKER, OF CHICAGO, ILLINOIS, ASSIGNOR TO THE MEAKER MANUFACTURING COMPANY, OF SAME PLACE.

FARE-REGISTER.

SPECIFICATION forming part of Letters Patent No. 478,167, dated July 5, 1892.

Application filed July 23, 1891. Serial No. 400,522. (No model.)

*To all whom it may concern:*

Be it known that I, JOHN W. MEAKER, a citizen of the United States, residing at Chicago, in the county of Cook and State of Illinois, have invented certain new and useful Improvements in Fare-Registers, of which the following is a specification, reference being had to the accompanying drawings, in which—

Figure 1 is a front view. Fig. 2 is a back view of the front portion of the case. Fig. 3 is a view of one end of the case. Fig. 4 is a view of the other end of the case, showing the sound-openings. Fig. 5 is a vertical section of the end of the case on line 5 5 of Fig. 4. Fig. 6 is horizontal section of one end of the case on line 6 6 of Fig. 5. Fig. 7 is a front elevation of the registering mechanism, the case and register-chains being removed. Fig. 8 is a similar view, the tens-of-thousands wheel being removed. Fig. 9 is an end elevation showing the bell-chamber. Fig. 10 is a side elevation of a portion of the register, showing the position of the pull-bar and the frame in which it is supported. Fig. 11 is a front view of the trip-register, showing the canceling devices. Fig. 12 is an end view of the trip-register frame, looking toward the right. Fig. 13 is a vertical section of the trip-registering mechanism on line 13 13 of Fig. 11, looking toward the right. Fig. 14 is a side elevation of the trip-register frame and the trip-registering mechanism. Fig. 15 is a section on line 15 15 of Fig. 11. Fig. 16 is a detail, being a front elevation of the resetting mechanism. Figs. 17 and 18 are details, being partial sectional views through the bell-chamber and the pull-bar frame, showing the means for operating the bell-ringing devices. Fig. 19 is a detail, being a view of the bell-ringing devices. Fig. 20 is a detail, being a perspective view of the under side of the dog which operates the hammer of the bell. Fig. 21 is a longitudinal vertical section on line 21 21 of Fig. 13. Figs. 22, 23, 24, and 25 are details showing the construction of the different links of the register-chains. Figs. 26 and 27 are detailed view of several of the links of the trip-register chains. Fig. 28 is a top view of the clutch-bar frame. Fig. 29 is a partial view of a removable back plate for the case.

My invention relates to fare-registers, and more particularly to that class of fare-registers shown and described in Letters Patent No. 397,602, dated February 12, 1889, No. 347,437, dated August 17, 1886, and No. 423,436, dated March 18, 1890, granted to me.

The object of my invention is to improve the construction and operation of fare-registers in general, and especially of the class referred to; and my invention consists in the several improvements illustrated in the drawings and hereinafter described.

That which I regard as new will be pointed out in the claims.

In the drawings, 1 indicates the case of the register, which is made of suitable size and shape to contain the various parts of the register. The case is provided at the front with sight-openings 2, 3, and 4, which may be protected by glass in the usual manner. The sight-openings 2 are so placed as to expose a portion of the trip-register chains, the openings 3 are so placed as to expose a portion of the chains of the total-register, and the sight-opening 4 is so placed as to expose one of the numbers upon the tens-of-thousands wheel. Suitable slides may be provided to cover the sight-openings of the total-register, if desired.

The register consists of a trip-registering mechanism and a total-registering mechanism, the trip-register and total-register being adapted to be operated by pawls mounted upon a common pull-bar. This feature is common to several of my former patents hereinbefore referred to.

The registering devices of the trip-register are mounted in a frame 5, Figs. 7, 8, and 13, which is secured at one side of a plate 6, Figs. 8 and 10. The registering devices of the total-register are mounted in a frame 7, which is somewhat similar to the frame 5, and is secured at the opposite side of the intermediate plate 6. The intermediate plate 6 is made of suitable form to receive a pullbar 8, by means of which the register is operated, and a resetting pull-bar 9, by means of which the chains of the trip-register may be returned to "0." In order to properly secure the pull-bars 8 and 9 in place and to adapt the plate 6 to receive the different devices which are mounted upon it, it is provided with lateral flanges 10, Figs. 9, 10, and 15, which project at one side at right angles to the plate and with lugs 11, which project on the same side at the top and bottom of the plate, as best shown in Fig. 10. A slot 12 is provided, through which the pawls for actuating the chains of the total-register may be inserted.

The frames 5 and 7 are in most respects similar in construction to the frames described in my former patent, No. 423,436, being composed of flanged plates 13, joined in pairs and united to form tracks or guideways for the register-chains. As in my former patent, above referred to, the interior portion of the plates 13 is cut out and a flange 14, Fig. 21, is provided at right angles to the body of the plate, which flange serves as a track around which the register-chains are moved by the operation of the register. The register-chains are each composed of ten links, the construction of which will be hereinafter more fully described, and which are connected by pins 15, which are somewhat longer than the width of the links and are adapted to rest upon the flanges 14 at each side of the chain in which they are placed. Over each flange 14 on the upper part of each of the frames 5 and 7 are mounted locking-pawls 16, Figs. 13 and 15, which are pivoted at one end to the sides of the frame and provided with wings 16ª, that rest upon the upper portion of the flange 14, over which they are placed. A spring 17 is provided, which is adapted by its tension to hold the pawl in contact with the flange. At a suitable point on the under side of each pawl is provided a recess, (not shown,) which is adapted to fit over the ends of the pins 15 as they pass under it by the operation of the register. The recess is so shaped that it will permit the end of the pins 15 to pass out of it when moved only in the direction indicated by the arrow in Fig. 13.

The pawls 16 over the sides of each register-chain are each preferably provided at their free ends with a projecting lip 18, Fig. 13, which extends under the connecting-rods 19, which connect the several portions of the chain-carrying frames. The lips 18 are so formed that they will prevent the pawls 16 from being raised a much greater distance than is sufficient to permit of the passage of the pins 15 from the recess in the pawls.

20 indicate curved lugs, which are secured to the inside of the plates 13 of each section of the chain-supporting frames in such position that they will be adapted to act as guides for the pins 15 of the registering-chain as it is moved around the frame. Two lugs 20 are preferably secured to each plate 13 at opposite corners, as best shown in Fig. 13. This construction confines the pins 15 more closely to the flanges 14 and materially aids in directing the chain around the frame at the portion of the greatest curvature of the frame.

The chain-carrying frame 5 of the trip-register is preferably adapted to receive two registering-chains, and the frame 7 of the total-register is adapted to receive four registering-chains substantially as in my former patent, No. 423,436, hereinbefore referred to. The chain of the trip-register, which is placed in the section marked 21, Fig. 7, of the frame 5, is adapted to register units, and the chain placed in the section marked 22, Fig. 7, of the frame 5 is adapted to register tens.

In the frame 7 of the total-register the units, tens, hundreds, and thousands chains are placed in the sections 23, 24, 25, and 26, respectively, as shown in Fig. 7. The units-chain of the total-register consists of ten links, nine of which are similar to that shown in Fig. 24, consisting of a broad flat link elliptical in shape. Each of the nine similar links of the units-chain is provided at one side with a depression 27, which is preferably formed by cutting through a part of the under portion of link to form a tongue and bending down the tongue toward the opposite side of the link, as best shown in Fig. 24. By this construction a notch is provided in each link, which is adapted to be engaged by the carrying-pawls. The under portion of one link of the units-chain is cut away, as shown in Fig. 23, whereby a recess 28 is formed, which extends entirely across the chain on its under side. The object of this construction will be hereinafter set forth.

When the sight-openings and chain-actuating mechanism are arranged as shown in my present application, the link having the recess 28 bears the numeral "8," as the arrangement is such that when "9" is exposed at the sight-opening the actuating-pawls will then rest in such recess in position to operate the next highest chain, as hereinafter described.

The tens, hundreds, and thousands chains are each substantially similar to the units-chain, and consist of nine links similar to that shown in Fig. 24, and a tenth link, which is substantially similar to the link having the recess 28 in Fig. 23, but is provided with a central bar 29, which extends centrally lengthwise of the link, as best shown in Fig. 23. The object of this construction will be hereinafter set forth.

Each of the links of the several chains is provided with a recess 30 at one end and a tongue 31 at the other end, which tongues are adapted to fit into the recesses 30. The links of each chain are united by means of pins 15, which pass through the ends of each of the links after the links have been united by inserting the tongues 31 into the recesses 30. The units-chain of the trip-register is also provided with nine links substantially similar to the link shown in Fig. 24. The tenth link of the units-chain of the trip-register is of the shape shown in Fig. 22, being provided with a deeper recess than the other links of the chain, for purposes which will appear hereinafter.

The links of the tens-chain of the trip-register are all similar to the link shown in Fig. 24, excepting that the depression 27 in such links is upon the side of the chain next to the units-chain.

32 (see Fig. 28) indicates a plate, which is attached to the rear portion of the main pull-bar 8 and projects from the pull-bar at each side, as shown in Fig. 28.

Pivoted upon a rod 33, Figs. 7, 8, and 28, mounted upon the plate 32, are pawls 34, 35, 36, and 37, which project downward and outward from the plate and are held in position by means of springs (not shown) wound around the rod 33. The pawls 36 and 37 are provided with lips 38 and 39, the lip 38 projecting under a portion of the pawl 35 and the lip 39 projecting under a portion of the pawl 36. By this construction when the pawl 35 is pressed downward toward the plate 32 the downward motion will be communicated to the pawls 36 and 37. Likewise when the pawl 36 is pressed downward the motion will be communicated to the pawl 37. In order to prevent the springs from holding the pawls at too great an angle with the plate 32 when the plate is removed from the frame, a lip 40, Fig. 28, is provided at the rear end of the pawl 35, which lip is adapted to engage with the plate 32 to hold the pawls at the desired angle with the plate. The pawls 35, 36, and 37 are each bifurcated, as shown in Fig. 28, one of the arms of each pawl being enlarged and rounded, as shown, whereby as the enlarged arm of each pawl bears on the surface of the register-chains the other arm will be held out of engagement with the notches in the links. Between the two arms of each of the pawls 35, 36, and 37 is provided a strengthening-web 41, as best shown in Fig. 28. The pawl 34 is for operating the units-chain of the total-register and is not connected to the other pawls of the total-register. The arm of the pawl 35, which is adjacent to the pawl 34, is enlarged, as shown, in order to hold the other pawls out of contact with the chains, except when the units-chain shows "0" at the sight-opening.

42 (see Figs. 7 and 28) indicates the carrying-pawl of the trip-register, which is similarly mounted upon the portion of the plate 32, which extends on the other side of the pull-bar 8 and is similar in construction to the pawl 35, being provided with a lip 43 upon its rear end, which is adapted to engage the surface of the plate 32 to limit the upward motion of the pawl. The pawl 42 is also bifurcated, and is provided with a web 44, a portion of which web extends to a point near the forward end of the pawl, as best shown in Fig. 28. The web 44 serves to strengthen the pawl 42, and by engaging a stop 99, hereinafter referred to, holds the pawl firmly in engagement with the links of the trip-register chains to prevent said chains from jumping.

That portion of the plate 32 upon which are mounted the pawls of the total-register is provided at its upper and lower edges with stops 45 and 46, which project outward and upward from the plate 32, as best shown in Fig. 28. The stops 45 and 46 are so placed that one of each of them will move under each chain of the total-register, and when the pull-bar is in its uppermost or normal position will lie in the angle formed by the hinging of the uppermost front link and the next lower one. The stops 45 thus operate to keep the register-chains in alignment, as when the pull-bar is returned to its uppermost position, if the chains are not in alignment, the stops 45 will strike them, owing to the inclined position of the upper link, and will return them to their proper position. These stops also act to lock the chains in position when the pull-bar is at its uppermost point, as they are so shaped as to lie close to the links of the chain at the angle formed at the connecting-point of two of the links of each chain. The stops 46 are adapted to prevent jumping or carrying over of the chains as the pull-bar is operated, and are of such shape that when the pull-bar is at its lowermost point they will lie close to the register-chains in such position that the chains cannot be moved without coming in contact with the stops.

That portion of the plate 32, Fig. 28, upon which is mounted the pawl 42 for operating the trip-register is provided at its lower edge with a stop 47, Figs. 8 and 28, which projects outward and upward from the plate and is similar to the stops 46. At the upper edge of the plate 32 are provided two spring-stops 48, Figs. 7, 8, and 28, the object of which is similar to that of the stops 45, and which are secured to the plate 32 and project at right angles from it, as best shown in Fig. 28. The stops 48 are adapted to be sprung slightly from the plate 32, so that they will not bear firmly against the register-chains of the trip-register when the main pull-bar is at its highest point, and thereby prevent the operation of the resetting mechanism. The stops 48 serve to keep the register-chains in alignment.

The pull-bar 8, to which the plate 32 is attached, consists of a hollow square bar, Fig. 28, and has attached to its lower end a thumb-piece 49. The pull-bar is adapted to fit into and to slide in the plate 6, and is provided at its upper end with a cap 50, which is fitted upon the top of the pull-bar and is provided with points which project therefrom. The projections upon the cap 50 are adapted to fit into suitable recesses 51 in the plate 6, as best shown in Fig. 10.

52, Fig. 18, indicates a spring, which is secured at its upper end to the cap 50 and at its lower end to the interior of the lower end of the pull-bar 8. By this construction a spring may be used which is as long as the pull-bar, whereby the life of the spring is greatly increased.

53, Fig. 10, indicates a notched plate, which is secured to the back of the pull-bar 8 near its upper end, as best shown in Fig. 10.

54, Figs. 10 and 18, indicates a dog, which is pivoted at 55 in the plate 6. The inner side of the dog 54 is squared and is in such a position that it will engage the rack-plate 53 as the pull-bar is moved upon said plate. The dog 54 operates to prevent the return of the pull-bar after it has been moved downward upon the plate 6 until the plate 53 has passed beyond the dog and to prevent downward movement of the pull-bar until it has reached its uppermost point. The plate 53 is so placed that it will not pass beyond the dog until the pull-bar has been drawn to its lowermost point upon the plate 6.

The dog 54, Figs. 10 and 18, is normally held in a position at right angles to the pull-bar 8 by means of a spring 56, which is secured at its lower end to the plate 6 and at its upper end passes through a slot 57, Fig. 18, in the dog 54, and bears against that portion of the dog which is adjacent to the pull-bar 8. In fare-registers provided with mechanism in general similar to that herein described for compelling a full stroke of the main pull-bar the spring which operated the dog which engaged the notched plate acted upon the dog in the line of the center. By my improved construction the spring is made to act upon the dog at a point out of its central line, whereby the action of the spring is made much quicker and more delicate and the efficiency of the dog is greatly increased.

58, Fig. 9, indicates a chamber, which is formed in the back portion of the chain-carrying frame 7. The chamber 58 is adapted to receive a bell 59, Fig. 9, which is attached to a plate 60, which is so shaped as to fit tightly into the chamber 58. The bell-chamber is made of such depth that sufficient space will be left in the forward portion of the chain-carrying frame to permit of the insertion of the mechanism for operating the register-chains.

Secured inside the bell 59, Fig. 9, is a bracket 61, Fig. 19, which is adapted to support a hammer or striker 62. The hammer 62 preferably consists of a round rod and is adapted to move longitudinally of the bracket 61, and is fitted in suitable sockets in the bracket, as best shown in Fig. 19.

63, Fig. 19, indicates a coiled spring, which is wound around a portion of the hammer 62, and at one end bears against a pin 64 or other suitable stop, which is suitably secured to the hammer near its outer end. The other end of the spring 63 bears against one end of the bracket 61.

65 indicates a smaller coiled spring, which is fitted around the forward portion of the hammer 62, between the pin 64 and the front end of the bracket 61, as best shown in Fig. 19. The rear end of the hammer 62 projects through the bracket 61 and is provided with a notch 66, as best shown in Figs. 17 and 18.

67 indicates a lever, which is provided at one side with a pivot 68, Fig. 20, adapted to fit into a bearing in the inner end of the bracket 61, as best shown in Fig. 19. The pivot 68 is provided with a projecting pin 69, which is slightly beveled, and is so arranged that by inserting the pivot 68 in the bracket 61 and drawing back the lever 67 the pin 69 will be caused to engage with the notch 66 upon the end of the hammer 62, as shown in Fig. 18. By then moving the lever 67 in an opposite direction the hammer 62 will be drawn backward a short distance, compressing the spring 63. By moving the lever 67 still farther the pin 69 will pass out of the notch 66 and the hammer will be released, the tension of the spring 63 causing it to fly forcibly outward until it strikes the bell 59. As soon as the hammer has struck the bell the tension of the spring 65 will act to prevent any reflex action of the hammer, so that it will be prevented from striking the bell more than once at each action of the lever 67.

70, Fig. 20, indicates a pin, which projects from the side of the pivot 68 and is adapted to engage the rear end of the hammer, as shown in Fig. 18, and to hold the striking end of it in close proximity to the bell when the pull-bar is in its normal or uppermost position. This prevents ringing the bell by jarring the register.

The lever 67 is provided on its outer end with a notch 71, as best shown in Figs. 19 and 20. The outer end of the lever 67 is adapted to project through the slot 12, Fig. 10, in the plate 6, as best shown in Fig. 17 and 18.

72, Fig. 10, indicates a pin, which is secured to the back of the pull-bar 8 and is adapted to enter the notch 71 upon the lever 67. The pin 72 may be secured either to the bar 8 or to the back of the plate 32. By this construction when the pull-bar is drawn downward it will draw the lever 67 downward, thereby drawing back the hammer 62, as best shown in Fig. 18. As the pull-bar is drawn to its lowermost point the pin 69 will pass out of the notch 66 upon the end of the hammer 62 and will allow the hammer to fly back, thereby striking the bell. When the pull-bar returns to its former position, the pin 69 will again come into engagement with the notch 66, and the various parts will then be in the position shown in Fig. 17.

73, Fig. 7, indicates a wheel for registering tens of thousands. The wheel 73 is pivoted at the front of the register and is supported by a plate 74, which is secured at its inner end to the plate 6, its outer end resting upon the chain-carrying frame 7, as best shown in Fig. 7. In the drawings I have shown a wheel 73, having sixteen points; but any other suitable number of points may be provided. The wheel 73 is adapted to be rotated from the thousands-chain 26, each complete revolution of the thousands-chain causing the wheel 73 to move the space of one notch and exposing the next successive number opposite the sight-opening 4 in the case of the register. The wheel 73 is operated from the thousands-chain, one of the links of which is provided with a lug 75, as best shown in Fig. 25. When the several chains are arranged in the frame, as shown in the drawings, the link marked 8 upon the thousands-chain would be the one upon which the lug 75 is placed, substantially for the same reasons as those set forth with regard to the links of the register-chains. At each complete revolution of the thousands-chain the link marked 8 will pass once under the outer portion of the tens-of-thousands wheel and the lug 75 will come into engagement with one of the notches upon the periphery of said wheel, causing the wheel to be moved one notch for each complete revolution of the thousands-chain. In order to prevent the tens-of-thousands wheel from moving more than one notch at a time, a spring 76 is provided, which is secured at its inner end to the plate 74 or to any other suitable portion of the frame of the register, and at its outer end is adapted to engage the notches upon the wheel 73, as best shown in Fig. 7. It is evident that as the wheel 73 is moved the space of only one notch at each complete revolution of the thousands-chain the figures upon the wheel 73 will register tens of thousands. When the wheel 73 has made a complete revolution, "0" will be exposed at the sight-opening and it will commence a new revolution; but, if desired, a suitable stop may be provided upon the wheel, by means of which the register will be locked when the wheel 73 has completed its revolution, so that it will be necessary to open the register to render it operative. The plate 74, upon which is mounted the wheel 73, is preferably removably secured in place, (see Fig. 7,) so that, if desired, the wheel 73 may be removed.

The resetting pull-bar 9 is substantially similar to the pull-bar 8, consisting of a hollow square bar 9. A cap 77 is adapted to fit upon the lower end of the bar, and a spring 78 is secured at one end to the cap 77 and at the other end to the upper part of the interior of the pull-bar 9, as best shown in Fig. 16. The bar 9 is adapted to move upon the plate 6 between one of the flanges 10 and the ends of the lugs 11, and the cap 77 is provided with projections 79, which are adapted to fit into suitable recesses in the plate 6, so that when the pull-bar is moved upon the plate 6 the cap 77 will remain stationary, whereby the spring 78 will be drawn out and by its tension will have a tendency to return the bar 9 to its lowermost position.

80 indicates a plate, which is secured to the bar 9 and projects from one side thereof, as best shown in Fig. 16. The plate 80 is adapted to support the resetting-pawls 81 and 82, which are pivotally mounted upon a rod 83, which extends horizontally across the plate 80.

84 indicates springs, which are wound around the rod 83, and by their tension are adapted to throw the pawls 81 and 82 outward from the plate 80. The pawls 81 and 82 are upon the side of the plate 80 which is next to the back of the register, and each pawl is provided on its upper end with a tooth 85, Fig. 15, which teeth are upon the adjacent ends of the pawls and are adapted to engage the recesses 27 in the links of the register-chains when moved upward. By this construction by pulling upward upon the resetting pull-bar when the trip-register chains do not stand, so that "0" will be exposed at the sight-opening, the teeth 85 upon the pawls 81 and 82 will both engage the recesses in the register-chains, and the chains will be moved together, moving one link for each operation of the pull-bar. In order to throw the teeth 85 out of engagement with the chains, when "0" is exposed at the sight-openings a cam 86, Figs. 13, 26, and 27, is secured upon the inner surface of one of the links of the units and tens chains, the cam 86 being so placed that when "0" is exposed at the sight-opening and the pull-bar is at its lowermost position a portion of the pawls 81 and 82 next to the teeth 85 will rest upon the cams 86, and will thereby be held at such a distance from the chains that the teeth 85 will be prevented from engaging with the chains as the pull-bar is operated. This will throw the teeth 85 out of engagement with the chains when "0" is exposed at the sight-opening, and so leave the chains reset at "0."

The operation of each pawl 81 and 82 is distinct from the other, so that when one of the chains is in such position that "0" is exposed at the sight-opening it will remain in such position until the other chain has also been returned to that position.

In order to avoid any strain upon the registering-chains caused by the violent pulling upon the resetting pull-bar, and also to prevent the register-chains from moving too far at each operation of the pull-bar, a stop 87, Fig. 14, is provided at the upper portion of the interior of the chain-carrying frame 5, which stop is located between the teeth 85 upon the pawls 81 and 82, and is in such position that when the pull-bar 9 is drawn upward sufficiently to carry the chains forward one link that portion of the pawls between the two teeth 85 will come into engagement with the stop 87, and further motion of the pull-bar will be prevented, and the strain, if any, will come upon the frame and not upon the chains. A slight depression 88 is provided under the stop 87, whereby when the pawls engage the stop 87 by pulling upward upon the pull-bar the pawls will be directed against the chains and will lock it in position.

89 indicates a flat spring, one of which is placed at each side of the chain-carrying frame 5 and extends lengthwise of the frame in about the position shown in Fig. 14, the other end of the spring being free, as shown. The spring 89 is adapted to engage a projecting portion 90, Fig. 27, upon each cam 86 to prevent backward motion of the chain. As the pull-bar 9 is returned to its lowermost position when "0" is exposed at the sight-openings, the pawls 81 and 82 will come into engagement with the cams 86, as above described, and the teeth 85 will be prevented from entering into engagement with the register-chains. When the pawls 81 and 82 strike the cams 86, there will be a slight backward pressure upon the chains, and by using the springs 89 to engage the cams 86 and to prevent the backward motion of the chains the action of the pawls at the proper time is insured.

The pawls 81 and 82, Fig. 16, are provided on their front sides with two pawls 91 and 92, which are of the shape shown in Figs. 14 and 15, and are adapted to operate the canceling devices.

93, Fig. 11, indicate cancelers which are adapted to cover the sight-openings 2 when the trip-registering chains are being returned to "0" by means of the resetting pull-bar. The cancelers 93 are adapted to close the sight-openings 2 until the chains are returned to "0" and are arranged and operated in the following manner: The cancelers are mounted in the frame 5, being pivoted one at each side of the frame, as best shown in Fig. 11. They are secured to bars 94, which, if desired, may be made integral with the cancelers, and which are suitably pivoted in the frame 5, and are adapted to be operated by means of springs 95, Figs. 12 and 14, to cause the cancelers 93 to be raised to the position shown in Fig. 11. Each rod 94 carries a lever 96, that projects a short distance into the interior of the frame 5, and is provided with a lug 96ª, Fig. 12, engaged by one end of the spring 95, which acts through said lug to hold the lever 96 up. The levers 96 are in such position that when the cams 86 are in position to hold the pawls 81 and 82 out of engagement with the register-chains the pawls 91 will be thrown forward sufficiently to engage the levers 96, as best shown in Fig. 15. This will cause the cancelers 93 to be held downward by the pawls 91 when "0" is exposed at the sight-opening. When the chains are moved forward by the registering mechanism, the cams 86 will pass from under the pawls 81 and 82, but the cancelers 93 will be prevented from closing the sight-openings by the pawls 91 and 92, as the pawl 92, by reason of its peculiar shape and position, will bear against one side of the levers 96, and the levers 96 and the pawls 91 and 92 will thereby be held in engagement with each other until they are released by a movement of the resetting pull-bar.

97 indicates springs, which are shaped as shown in Fig. 11, one of which springs is secured to one side of each canceler 93. One end of each spring 97 projects beyond the inner end of the canceler to which it is attached and is adapted to engage a stop 98 upon the frame 5 when the cancelers are at their highest position. By this construction the spring 97 serves as a yielding stop to limit the upward motion of the cancelers. This is necessary for the reason that it sometimes happens that in resetting the trip-register the resetting pull-bar will be returned to its normal position before the register-chains have been moved the space of one link. If this should happen at such a point as to partially expose "0" at the sight-opening, the pull-bar will return to its normal position and will leave the canceler displayed at the sight-opening. The pawls 91 and 92 will thereby pass back of the levers 96 and the pawls 81 and 82 will rest upon the cams 86. If the resetting pull-bar should now be operated, the pawls 91 and 92 would strike against the lever 96, and if the pull-bar should be drawn to its outermost point there would be danger of the levers 96 being broken if the levers 96 are not free to move upward far enough to permit the pawls 91 and 92 to pass by. By providing the cancelers with yielding stops, as described, the levers 96 and cancelers 93 are free to move upward if it should be necessary, and the danger of breakage is thereby avoided. If desired, instead of placing a spring upon the canceler, as shown, the stop 98 may be made yielding, in which case the canceler could be provided with a rigid projection adapted to engage the stop 98. The construction shown, however, is preferred. The lower ends of the springs 97 extend forward and downward, as shown in Fig. 11, and are adapted to strike against the sides of the frame 5 when the cancelers are turned downward. By this construction the lower ends of the springs 97 act as cushions to limit the downward motion of the cancelers as they are moved downward by the downward motion of the pull-bar.

99 indicates a stop, which is somewhat similar to the stop 87 and is centrally located in the interior of the frame 5, as best shown in Fig. 13. The stop 99 is adapted to be engaged by the pawl 42 on the plate 32 of the main pull-bar 8 to prevent the chains from being carried more than the space of one link at each stroke. The stop 99 engages with the portion of the web 44 of the pawl 42 when the main pull-bar is at its lowermost point.

The side of the case 1 which covers the opening of the bell-chamber 58 is provided with sound-openings, which consist of depressed strips 100, arranged in the form shown in Fig. 4. In order to prevent access to the bell-chamber through the openings thus formed, bars 101 are attached to the side of the cover and extend lengthwise of the cover between adjacent depressions 100, as best shown in Fig. 6. This construction effectually prevents access to the interior of the case.

The operation of my improved register is as follows: When the main pull-bar is operated, the pawl 34, which is normally in engagement with one of the recesses 27 upon the units-chain of the total-register, will move said chain the distance of one link at each reciprocation of the pull-bar. The inner arm of the pawl 42 will also engage with one of the notches upon the units-chain of the trip-register and will move such chain the distance of one link. The units-chain of the trip-register is so arranged that when "9" is exposed at the sight-opening the link having the deep recess, as shown in Fig. 22, will be opposite the inner arm of the pawl 42, which operates the trip-register. This will permit the inner arm of the pawl 42 to enter farther into the link and will permit the outer arm of said pawl to engage one of the depressions 27 upon the tens-chain of the trip-register, so that at the next operation of the pull-bar the tens-chain will be moved the space of one link. The inner arm of the pawl 42 is made to project a short distance above the outer arm, so that when links having recesses of the ordinary depth are engaged by said pawl the outer arm of the pawl will be held out of engagement with the recesses in the tens-chain.

By constructing the links of the chains as shown, nine of the links of each chain having a recess at one side of their under surface and the tenth link having a recess extending entirely across its under surface, one of the arms of the actuating-pawls will bear against the unbroken portion of the under surface of the links, and will therefore be prevented from operating the next higher chain of the series of chains in the register until the link having the recess extending entirely across its under surface is engaged by the pawl.

In the total-register the links of the units-chain are so arranged that when the chain is in such position that "9" is exposed at the sight-opening a link of the shape shown at 28 in Fig. 23 will be opposite the pawl 34 and the adjacent arm of the pawl 35. This will permit said arm of the pawl 35 to enter the recess in the units-chain, and the other arm of the pawl 35 will thereby be permitted to engage the recess in one of the links of the tens-chain, so that by the next reciprocation of the pull-bar the tens-chain will be moved the space of one link.

In order to avoid the possibility of the hundreds and thousands chains accidentally being engaged by the pawls 36 and 37, the inner arm of the pawl 35 is made somewhat larger than the inner arms of the pawls 36 and 37, whereby the pawls 36 and 37 will be held at a greater distance from the surface of the links and the danger of their accidentally engaging the links will be avoided. The operation of the hundreds and thousands chains is substantially similar to that of the tens-chain.

The operation of the tens-of-thousands wheel has already been described.

When the pull-bar 8 is drawn downward to its lowermost point, the stops 46 and 47 upon the lower edge of the plate 32 will approach so near the links at the angle formed at the connecting-point of two of the links by the passage of the chain around the lower end of the frame that the chains will be prevented from moving out of their proper position. Jumping of the chains is thereby prevented, as if the chains are moved forward more than the proper distance they will come in contact with the stops 46 and 47, which will prevent their moving farther. By constructing the pawls 35, 36, 37, and 42 as shown a much better engagement is secured between the pawls and the register-chains, and the various parts are thereby rendered much more durable. When the pull-bar is returned to its uppermost position, if their chains are not in their proper positions the stops 45 and 48 will come in contact with the hinges of the links at the upper portion of the register and will return the links into alignment and more squarely opposite the sight-openings if they have been carried too far. The stops 45 serve to lock the chains in position when the pull-bar is at rest, as they cannot be moved without engaging the stops. The webs 41 and 44 upon the pawls serve to strengthen them, and, as hereinbefore described, the web 44 is adapted to engage the stop 99 upon the frame 5 to hold the pawl 42 firmly in engagement with the links of the trip-register chains and thereby prevent the chains from jumping.

I provide the tens, hundreds, and thousands chains each with a link having a central rod 29 upon its lower surface, as best shown in Fig. 23. This construction prevents the stops 46 from accidentally engaging the link by the dropping of the chain, as the rod 29 in such event would rest upon the stop and hold it out of engagement with the link.

The office of the lips 38 and 39 upon the pawls 36 and 37 is substantially similar to that shown and described in my former patent, No. 423,436, hereinbefore referred to, the object being to prevent the pawls 36 and 37 from engaging the links of the hundreds and thousands chains until the tens and hundreds chains, respectively, shall have made a complete revolution.

The resetting mechanism is operated, as hereinbefore described, to return the trip-registering chains to zero at the end of the trip, which is accomplished by reciprocating the resetting pull-bar 9 in the usual manner.

In order to securely inclose the registering mechanism in the case 1 and to prevent the register from being tampered with, a plate 102, Fig. 29, is provided, which is adapted to slide upon the back of the case 1. To adapt the case 1 to receive the back plate, the rear edges of said case are bent over at the top and bottom to form flanges 103, as best shown in Fig. 2. At one end of the case the rear edge is bent over to form a groove adapted to receive one of the ends of the back plate, as best shown at 104 in Fig. 4. The sides of the back plate are bent over to form grooves 105, Fig. 29, which are adapted to slide upon the flanges 103. At one end the back plate is provided with spring-catches 106, which are adapted to engage the inner portion of one end of the case 1 when the back plate is in position to lock the back plate upon the case. In order to remove the case, the catches are pressed upward by a suitable key, a hole being left in the plate to permit of the introduction of the key.

107, Fig. 29, indicates a seal, which is secured over the hole above referred to, whereby the back plate cannot be removed from the case without removing the seal.

108, Fig. 7, is a loop, by means of which a ring may be attached to the register-frame to hold the strap for suspending the register around the conductor's neck.

109 designates a strengthening-bead that may be formed in the plate 32, attached to the main pull-bar.

110, Fig. 10, are recesses or cut-away portions of the plate 6 to receive lugs 112, Fig. 21, attached to the trip-register frame for securing it to said plate.

That which I claim as new, and desire to secure by Letters Patent, is—

1. In a fare-register, a units-chain composed of a series of links elliptical in shape, each tenth link having a depression extended across its surface and each of the other links having a recess at one side of its under surface, in combination with other register-chains and actuating mechanism, substantially as and for the purpose specified.

2. In a fare-register, the combination of register-chains for registering tens, hundreds, and thousands, each chain composed of a series of elliptical-shaped links, nine of said links being provided at one side of their under surface with a recess and the tenth link being provided with a recess extended entirely across its under surface, a central rod 29, extended lengthwise of each tenth link on its lower surface, and actuating mechanism for said chains, substantially as and for the purpose specified.

3. In a fare-register, a units-register chain composed of nine elliptical-shaped links, each provided with a depression 27 at one side of its under surface, and a tenth link having a recess 28, substantially as and for the purpose specified.

4. The combination, with a register-frame composed of sections having their inner portions cut out and interior flanges in said frame to form tracks to carry register-chains, of the register-chains adapted to move upon said tracks and lugs 20, secured in said frame and adapted to guide the chains around the corners of the register-frame, substantially as specified.

5. The combination, with a register-frame composed of sections, rods 19, uniting the several sections of the frame, and register-chains adapted to move around said frame, of pawls 16, mounted at and in the top of the frame and adapted to prevent backward motion of the chains, each of said pawls having an extension 18 projecting under the rods 19 and adapted to limit the upward motion of the pawls, substantially as specified.

6. In a fare-register, the combination, with a frame for supporting the chains of a trip-register and a frame for supporting the chains of a total-register, of a detachable plate interposed between said frames to unite the frames, substantially as specified.

7. The combination, with a detachable plate adapted to support a main pull-bar and a resetting pull-bar, of chain-carrying frames secured at opposite sides to said plate, pull-bars supported in said plate, and register-chains adapted to move in said frame, substantially as and for the purpose specified.

8. The combination, with a plate 6, having lateral flanges 10 and lugs 11, of pull-bars 8 and 9, adapted to be held by said plate, and chain-carrying frames 5 and 7, adapted to be secured at opposite sides of said plate, substantially as and for the purpose specified.

9. The combination of the plate 6, a pull-bar 8, adapted to move upon said plate, the notched block 53, secured upon said pull-bar near its upper end, the dog 54, pivotally mounted upon said plate and adapted to engage the notches upon the block 53 when the pull-bar is operated, and the spring 56, having one end attached to said plate 6 and its other end directly engaged with and acting upon said dog between the pivot of the dog and the notched bar and adapted to hold the dog at right angles to the line of motion of the pull-bar, substantially as described, for the purpose specified.

10. The combination, with a hollow pull-bar 8, having a cap 50 resting upon its upper end and a spring 52, fitted in said pull-bar and secured at its lower end to the bottom of the pull-bar and at its upper end to said cap, of a plate 6, adapted to support said pull-bar and provided with recesses 51 to receive projections on the pull-bar cap for securing said cap in position upon the plate, substantially as and for the purpose specified.

11. The combination, with a hollow pull-bar 8, having a cap 50 at its upper end, said cap projecting from the sides of the pull-bar, and a spring 52, secured to the lower portion of the pull-bar and to the cap 50, of a plate 6, adapted to support the pull-bar, said plate having a recess 51, adapted to receive the projecting portion of the cap 50, substantially as and for the purpose specified.

12. The combination, with a chain-carrying frame and register-chains carried thereby, of a pull-bar having a plate 32, and the bifurcated and webbed pawls 35 36 37, carried by said plate and actuated from the pull-bar for operating the register-chains, one of the arms of each of said pawls being provided at its outer end with an enlarged and rounded portion to bear on said chains, the said pawl 35 having at its rear end a lip 40 to engage the plate 32 and hold the pawls at the desired angle, and the pawls 36 and 37 being provided with lips 38 and 39 to engage adjoining pawls, substantially as and for the purpose specified.

13. The combination, with a chain-carrying frame and register-chains carried thereby, of a pull-bar 8, provided with a plate 32, and the pawls 34, 35, 36, and 37, mounted on said plate and actuated by the pull-bar to operate the register-chains, said pawl 35 having a downwardly-projecting lip 40 and the pawls 35, 36, and 37 being bifurcated and webbed and each having an enlarged rounded portion at the outer end of one arm, substantially as and for the purpose specified.

14. The combination, with a chain-carrying frame and register-chains mounted in said frame, of a pull-bar, pawls mounted upon said pull-bar for operating the chains of the register, and stops 46 upon the lower edge of the pull-bar, substantially as and for the purpose specified.

15. The combination, with a chain-carrying frame and register-chains mounted upon said frame, of a pull-bar, pawls mounted upon said pull-bar and adapted to operate the chains of the register, and stops 45 upon the upper edge of the pull-bar, substantially as and for the purpose specified.

16. The combination, with a chain-carrying frame, register-chains carried thereby, and devices for returning the chains to zero, of a bifurcated pawl for operating the register-chains, a plate for supporting the pawl, and spring-stops 48, secured to said plate and projecting beyond its upper edge, substantially as and for the purpose specified.

17. The combination, with a chain-carrying frame 5 and register-chains carried thereby, of a pull-bar adapted to move in said frame, a bifurcated pawl mounted upon said pull-bar, a web 44 upon one arm of said pawl, and a stop 99 in said frame 5, adapted to be engaged by the web 44 when the pull-bar is at its lowermost position, substantially as and for the purpose specified.

18. The combination, with a chain-carrying frame and register-chains carried thereby, of a canceler mounted upon said frame and adapted to cancel the reading of said chains, and a spring-stop adapted to limit the motion of the canceler, substantially as and for the purpose specified.

19. The combination, with a chain-carrying frame and chains carried thereby, of cancelers 93, mounted upon said frame, springs 97, secured to said cancelers, the upper ends of the springs projecting beyond the ends of the cancelers, and a stop 98, adapted to engage the ends of the springs 97, substantially as and for the purpose specified.

20. The combination, with a chain-carrying frame and chains carried thereby, of cancelers mounted upon said frame and springs secured to said cancelers, said springs having downwardly-projecting ends adapted to strike the side of the frame when the cancelers are drawn to their lowermost point, substantially as and for the purpose specified.

21. The combination, with a chain-carrying frame, chains carried thereby, mechanism for operating said chains, and canceling devices mounted upon said frame, of a resetting pull-bar, a plate carried by said pull-bar, and pawls 81 and 82, carried by said plate and adapted to operate the register-chains and the canceling devices, substantially as and for the purpose specified.

22. The combination, with a chain-carrying frame, register-chains carried thereby, mechanism for operating said chains, and a stop 87 in said frame, of a resetting pull-bar, pawls carried by said pull-bar, and teeth upon said pawls adapted to engage the register-chains, said teeth being adapted to engage the stop 87 when the pull-bar reaches its uppermost point, substantially as and for the purpose specified.

23. The combination, with a chain-carrying frame, register-chains carried thereby, a cam 86 on one of the links of each of said chains, canceling devices mounted upon said frame, and levers 96, connected to said canceling devices, of a resetting pull-bar, pawls 81 and 82, carried by said pull-bar, said pawls having teeth 85, and pawls 91 and 92, said pawls 91 and 92 being adapted to operate the canceling devices, substantially as and for the purpose specified.

24. The combination, with a chain-carrying frame and register-chains carried thereby, each of said chains having a cam 86 upon one of its links, of a resetting pull-bar, pawls carried by said pull-bar, and canceling devices adapted to close the sight-openings of the register when the resetting pull-bar is operated, said pawls being operated by said cams to operate the canceling devices, substantially as described.

25. The combination, with a chain-carrying frame, register-chains carried thereby, and stops 91 upon one of the links of each of said chains, of springs 89 upon said frame and mechanism for operating said chains, substantially as and for the purpose specified.

26. In a fare-register, the combination, with a chain-carrying frame, of a units-chain consisting or ten elliptical-shaped links, each having a recess or notch upon one side of its under surface and one of said links having a deeper recess than the others, a tens-chain also consisting of ten elliptical-shaped links, each of said links having a recess or notch, the notches in the units and tens chains being adjacent to each other, and mechanism for operating said chains, substantially as and for the purpose specified.

27. In a fare-register, the combination, with a bell, a striker 62, mounted therein, said striker having a notch 66 at its outer end, devices for supporting said striker, and a spring adapted to cause the striker to strike the bell, of a lever pivotally mounted in said bell, a pin 69, carried by said lever and adapted to engage the notch 66, and devices for operating said lever by the operation of the register, substantially as and for the purpose specified.

28. The combination, with a bell 59, a bracket 61, secured at the inside of said bell, and a striker 62, carried by said bracket, said striker having a notch 66 at its outer end, of springs 63 and 65, mounted upon said striker, and a lever 67, pivotally mounted in said bell, said lever having a notch 71 and pins 69 and 70, substantially as and for the purpose specified.

29. In a register, the combination, with a bell and a striker 62, mounted therein, said striker being adapted to be operated to ring the bell at each operation of the register, of a lever having a pin 70 for holding the end of the striker normally in close proximity to the bell, substantially as and for the purpose specified.

30. The combination, with a bell, a striker 62, mounted in said bell, and the spring 63, adapted to cause the striker to strike the bell, of a lever 67, pivotally mounted in said bell, said lever having a pin 70, adapted to engage the outer end of the striker, substantially as and for the purpose specified.

31. The combination, with a register-frame and a chain adapted to move around said frame, of tracks in said frame for supporting the chain and outer guides located at diagonally-opposite corners of the frame and adapted to direct the chain as it moves around the frame, substantially as and for the purpose specified.

32. The combination, with a chain-carrying frame and chains carried thereby, of a pull-bar, pawls mounted thereupon for operating the chains, and devices for locking the chains when the pull-bar is at rest, substantially as and for the purpose specified.

33. The combination, with a chain-carrying frame and register-chains carried thereby, of cancelers 93, mounted upon said frame, and a yielding stop upon each of said cancelers adapted to limit their upward motion, substantially as and for the purpose specified.

JOHN W. MEAKER.

Witnesses:
ALBERT H. ADAMS,
JOHN L. JACKSON.